United States Patent [19]
Kazui et al.

[11] Patent Number: 5,825,425
[45] Date of Patent: *Oct. 20, 1998

[54] MOVING-PICTURE CODING DEVICE EMPLOYING INTRA-FRAME CODING AND INTER-FRAME CODING

[75] Inventors: Kimihiko Kazui; Akira Nakagawa; Eishi Morimatsu, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 754,618

[22] Filed: Nov. 21, 1996

[30] Foreign Application Priority Data

Jun. 10, 1996 [JP] Japan .................... 8-147051

[51] Int. Cl.$^6$ .................................................. H04N 7/50
[52] U.S. Cl. ........................ 348/420; 348/415; 348/416
[58] Field of Search ........................ 348/409, 410, 348/411, 412, 415, 416, 420, 400, 401, 402, 700, 699; H04N 7/50

[56] References Cited

U.S. PATENT DOCUMENTS

| | | |
|---|---|---|
| 3,553,361 | 1/1971 | Mounts .................................... 348/415 |
| 3,553,362 | 1/1971 | Mounts .................................... 348/415 |
| 3,571,505 | 3/1971 | Mounts .................................... 348/416 |
| 4,651,206 | 3/1987 | Ohki ........................................ 348/416 |
| 5,136,378 | 8/1992 | Tsurube ................................... 348/415 |
| 5,260,783 | 11/1993 | Dixit ........................................ 348/415 |
| 5,440,345 | 8/1995 | Shimoda .................................. 348/411 |
| 5,488,482 | 1/1996 | Ueda et al. .............................. 348/402 |
| 5,508,743 | 4/1996 | Iizuka ...................................... 348/415 |
| 5,537,215 | 7/1996 | Niimura et al. .......................... 386/68 |

FOREIGN PATENT DOCUMENTS

| | | |
|---|---|---|
| 1-258573 | 10/1989 | Japan . |
| 3-064190 | 3/1991 | Japan . |
| 7-095564 | 4/1995 | Japan . |

*Primary Examiner*—Brian Casler
*Assistant Examiner*—LuAnne P. Din

[57] ABSTRACT

A device for coding moving pictures includes a coding unit for applying intra-frame coding or inter-frame coding to the of blocks dividing each frame of the moving pictures. The device further includes a refresh-operation-control unit for controlling the coding unit to carry out the intra-frame coding as a refresh operation at predetermined intervals. The refresh-operation-control unit reschedules the predetermined intervals when the coding unit applies the intra-frame coding during one of the predetermined intervals, such that a timing of the intra-frame coding during the one of the predetermined intervals marks a start of a next one of the predetermined intervals.

9 Claims, 7 Drawing Sheets

MOVING-PICTURE CODING DEVICE EMPLOYING INTRA-FRAME CODING AND INTER-FRAME CODING

BACKGROUND OF THE INVENTION

1. Field of the Invention

The present invention generally relates to moving-picture coding devices, and particularly relates to a moving-picture coding device which employs intra-frame coding and inter-frame coding and performs refresh operations through the intra-frame coding.

2. Description of the Related Art

An inter-frame coding scheme is one of the highly efficient coding techniques used for encoding moving pictures. The inter-frame coding scheme draws on high correlations between consecutive frames to encode differentials between a currently processed frame and a previous frame with help of motion estimation for the previous frame. Such a scheme is adopted by ITU-T H.261, ISO/IEC MPEG-1 (moving picture experts group phase 1), and ISO/IEC MPEG-2, for example, which are the international standards of the moving-picture coding schemes.

Various moving-picture coding devices having different configurations are available, and can be used for implementing the inter-frame coding scheme. Typically, such a moving-picture coding device includes an intra-frame coding unit, an inter-frame coding unit having a frame memory, a motion-detection unit, a quantization unit, and a variable-length coding unit. When such a device is used for communication or broadcasting purposes, a first frame is subjected to the intra-frame coding, and following frames are encoded by using the inter-frame coding.

Each image of the moving pictures is typically divided into a plurality of blocks, and the intra-frame coding or the inter-frame coding is applied to each of these blocks. The intra-frame coding carries out predictive coding within a currently processed block. On the other hand, the inter-frame coding applies predictive coding to a differential image obtained between a currently processed block of a current frame and a corresponding block of a reference frame. (The reference frame is a previous frame or/and a future frame depending on whether the inter-frame coding is directionally predictive coding or bidirectionally predictive coding.)

A block of a reference frame is found to be the corresponding block if the motion-detection unit detects that this block has the highest correlation with the currently processed block. The corresponding block may have a spatial position different from the position of the currently processed block within an image frame. This case indicates that motion is present with respect to the currently processed block, and the positional relation between the currently processed block and the corresponding block is represented by a motion vector.

Since the intra-frame coding results in coded images having a larger amount of information than those resulting from the inter-frame coding, use of the inter-frame coding is preferable without using the intra-frame coding. Because of the following reasons, however, intra-frame coding should be carried out once in a while between the inter-frame coding.

If only the inter-frame coding is employed for a number of consecutive image frames, use of the discrete cosine transform (DCT) for spatial frequency transformation causes a degradation in image quality. This degradation is created when images locally decoded in a coding device on the sender side have discrepancies with images decoded in a decoding device on the receiver side. Differences in calculation accuracy between the coding device and the decoding device are to be blamed for these discrepancies. These errors widen through accumulation as the inter-frame coding continues. Namely, inconsistencies between the locally decoded images on the sender side and the decoded images on the receiver side grow as time passes. If the intra-frame coding is carried out from time to time, however, these accumulated errors between the locally decoded images and the receiver-side-decoded images can be eliminated at the frame subjected to the intra-frame coding.

Further, if only the inter-frame coding is used for a number of consecutive image frames, a transmission error occurring at one frame results in the following frames suffering from this error as long as inter-frame coding continues. If the intra-frame coding is carried out from time to time, errors of the past are stopped from carrying over their influence to the frames following the intra-frame coding.

For the reasons described above, the intra-frame coding is carried out at constant intervals, which is called a refresh operation. International standard H.261 as mentioned above switches between the intra-frame coding and the inter-frame coding for each block of an image frame to carry out block-wise refresh operations. International standard H.261 defines the predetermined intervals of the refresh operations as an interval during which blocks having valid coefficients are generated hundred-thirty-two times, and the refresh operation by the intra-frame coding is conducted at the end of each of such intervals.

Definitions of valid coefficients and invalid coefficients are as follows. If a block and a corresponding block of the reference frame have insignificant differences in view of quantization step sizes so that there is no need to transmit a differential image to the receiver side, this block is referred to as having the invalid coefficients. If a block has sufficient differences with the corresponding block so that there is a need to transmit the differential image, this block is referred to as having valid coefficients.

The reason why each block, rather than the entire frame, is subjected to the refresh operation is because the amount of information to be processed can be suppressed in this way. If the intra-frame coding is carried out for the entire frame, a large amount of information needs to be processed, thereby causing overflows of buffer memories. To avoid overflows, skipping of frames becomes necessary, leading to a degradation in reconstructed image quality and to an increase of delay time.

The discrete cosine transform is typically applied to each sub-block which is comprised of 8×8 pixels. A plurality of sub-blocks constitute a macro block, which can be used as the above-mentioned block to apply the intra-frame coding and the inter-frame coding.

Japanese Patent Laid-Open Application No.1-258573, for example, discloses a technique applying the refresh operations to a block which is ascertained as an effective block. Japanese Patent Laid-Open Application No.3-64190, for example, teaches a technique conducting the refresh operations by applying the intra-frame coding successively to each block when a frame has no correlation. Further, a technique to control the refresh operations based on the amount of information generated by blocks subjected to the refresh operations by the intra-frame coding and blocks subjected to the inter-frame coding is known. This technique is disclosed, for example, in Japanese Patent Laid-Open Application No.7-95564.

As described above, highly effective moving-picture coding techniques employing the inter-frame coding carry out the refresh operations at predetermined intervals. The shorter the intervals, the smaller the discrepancies between the locally decoded images on the sender side and the decoded images on the receiver side. However, shorter intervals mean an increase in the amount of information due to an increased use of the intra-frame coding for the refresh operations. Elongation of the intervals, on the other hand, can reduce the amount of information. However, this results in an increase of the discrepancies between the locally decoded images and the receiver-side-decoded images, thereby creating a problem of image-quality degradation.

International standard H.261, for example, uses a period of 132-valid-coefficient blocks as an interval of the refresh operations, as described above. This interval may be appropriate in terms of keeping a balance between the need for a reduced information amount and the need for an enhanced image quality. However, the intra-frame coding is not only carried out for the refresh operation, but also carried out at other occasions. A scene change is one of such occasions. When the moving pictures have a scene change, the motion-detection unit detects the occurrence of the scene change by finding too small correlations between a currently processed frame and a reference frame. Based on this detection, the moving-picture coding device uses the intra-frame coding for each block of the currently processed block.

Conventionally, the intra-frame coding other than for the refresh operations is conducted independently of the refresh operations. Such independent intra-frame coding brings about an undesirable increase in the amount of information for encoded images.

Figure 1:
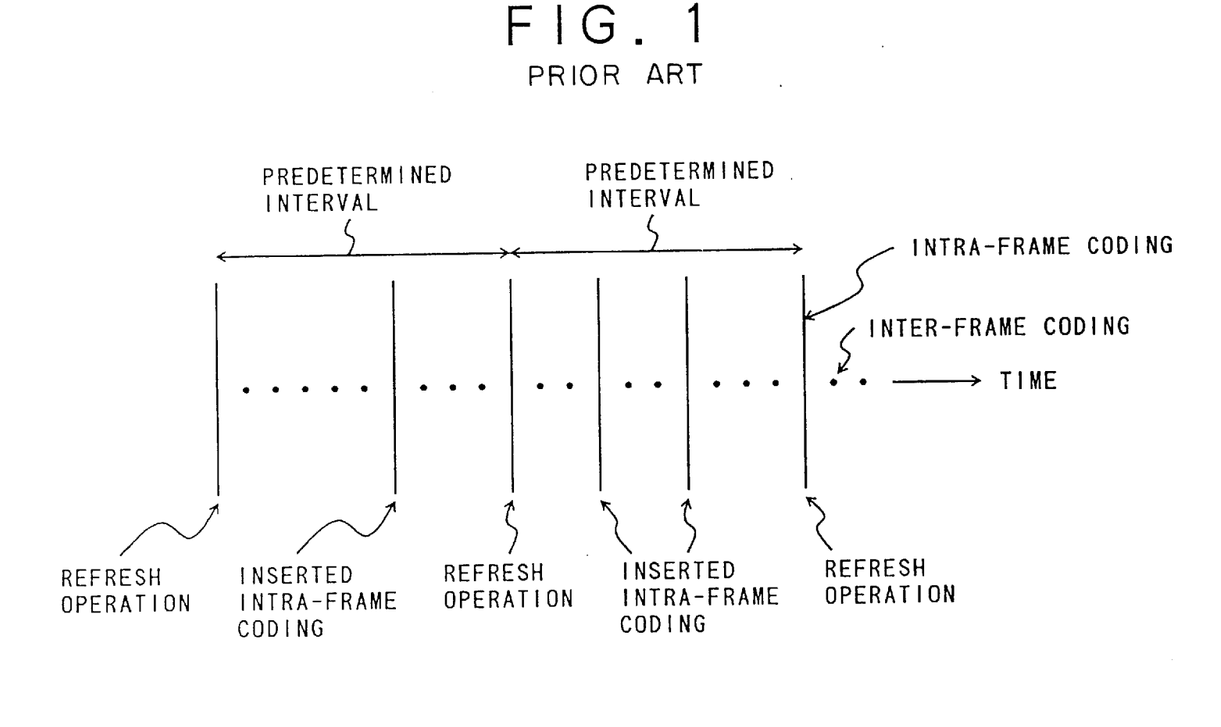
FIG. 1 is an illustrative drawing showing insertions of independent intra-frame coding among inter-frame coding.

FIG. 1 is an illustrative drawing showing insertions of/the independent intra-frame coding among the inter-frame coding. As shown in FIG. 1, the intra-frame coding for the refresh operations is conducted at predetermined intervals such as 132-valid-coefficient periods. (This interval is actually longer than a 132-frame period when there are blocks having invalid coefficients.) Also, FIG. 1 shows the intra-frame coding inserted independently of the refresh operations. As can be seen, because of the independently inserted intra-frame coding, intervals between the intra-frame coding become shorter than the predetermined intervals. Such shorter intervals result in an increase in the amount of the information, as described above.

Figure 2:
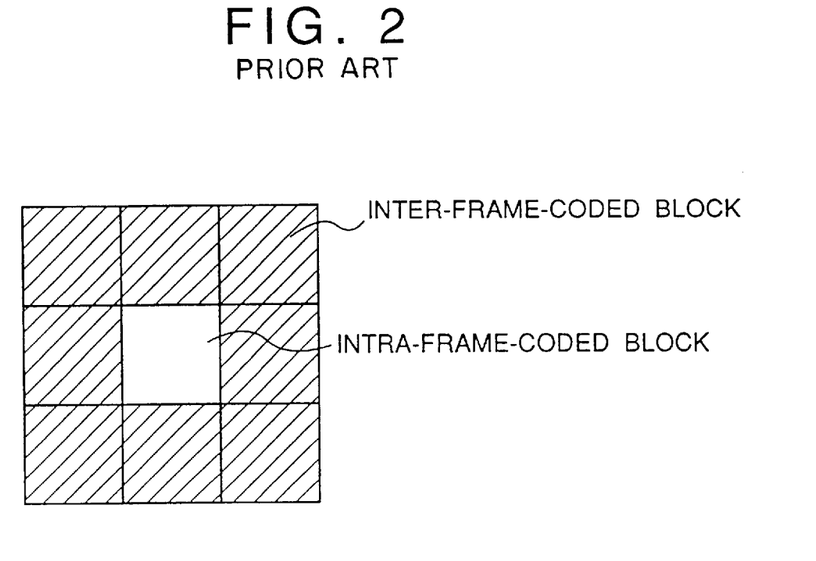
FIG. 2 is an illustrative drawing showing a prominent appearance of an intra-frame-coded block.

Further, when a given block is subjected to the intra-frame coding for the refresh operation, this block may show a stark contrast to the surrounding blocks which are processed by the inter-frame coding. This is because the block processed by the intra-frame coding has a better image quality than the blocks going through the inter-frame coding. In such a case, reconstructed images show rather prominent borders between the intra-frame-coded block and the surrounding inter-frame-coded blocks. FIG. 2 is an illustrative drawing showing a prominent appearance of such an intra-frame-coded block.

Accordingly, there is a need for an image processing device which can extend the refresh intervals without creating an undue degradation in image quality.

Also, there is a need for an image processing device which can suppress a contrast between a block subjected to the intra-frame coding and surrounding blocks subjected to the inter-frame coding.

SUMMARY OF THE INVENTION

Accordingly, it is a general object of the present invention to provide an image processing device and an image processing method which can satisfy the need described above.

It is another and more specific object of the present invention to provide an image processing device which can extend the refresh intervals without creating an undue degradation in image quality.

In order to achieve the above objects according to the present invention, a device for coding moving pictures includes a coding unit for applying intra-frame coding or inter-frame coding to each of blocks dividing each frame of the moving pictures. The device further includes a refresh-operation-control unit for controlling the coding unit to carry out the intra-frame coding as a refresh operation at predetermined intervals, the refresh-operation-control unit rescheduling the predetermined intervals when the coding unit applies the intra-frame coding during one of the predetermined intervals such that a timing of the intra-frame coding during the one of the predetermined intervals marks a start of a next one of the predetermined intervals.

The device described above controls the predetermined intervals of the block-wise refresh operations such that an interval starts from the intra-frame coding of a refresh operation or the intra-frame coding for purposes other then the refresh operations. This achieves elongation of intervals between the intra-frame coding as much as possible so as to enhance the coding efficiency without causing an undue reduction in image quality.

It is yet another object of the present invention to provide an image processing device which can suppress a contrast between a block subjected to the intra-frame coding and surrounding blocks subjected to the inter-frame coding.

In order to achieve the above-identified object according to the present invention, a device for coding moving pictures includes a coding unit for applying intra-frame coding or inter-frame coding to each of blocks dividing each frame of the moving pictures, and a refresh-operation-control unit for controlling the coding unit to carry out a refresh operation at predetermined intervals by applying the intra-frame coding to either one of a currently processed block of a current frame or a corresponding block of a reference frame.

The device described above uses the corresponding block of the reference frame as a block to be subjected to the intra-frame coding of the refresh operation when the currently processed block is found to be a motionless block. Since the corresponding block of the reference frame incurs quantization errors, this device achieves the coding of moving pictures without arousing odd visual sensation, by suppressing a contrast between the block subjected to the intra-frame coding and surrounding blocks subjected to the inter-frame coding.

In the above-described device, if the currently processed block is found to be a motion block, this currently processed block is used for the intra-frame coding of the refresh operation, rather than using the corresponding block of the reference frame. This is because the use of the corresponding block of the reference frame when the motion is present may result in an insertion of an inappropriate block into a position of the currently processed block.

Further, functions of the former device and functions of the latter device can be incorporated in a single device to achieve the two-fold objects described above. Namely, such a configuration can provide an image processing device which can extend the refresh intervals without creating an undue degradation in image quality, and, at the same time, can suppress a contrast between a block subjected to the intra-frame coding and surrounding blocks subjected to the inter-frame coding.

Other objects and further features of the present invention will be apparent from the following detailed description when read in conjunction with the accompanying drawings.

DESCRIPTION OF THE PREFERRED EMBODIMENTS

In the following, an embodiment of the present invention will be described with reference to the accompanying drawings.

Figure 3:
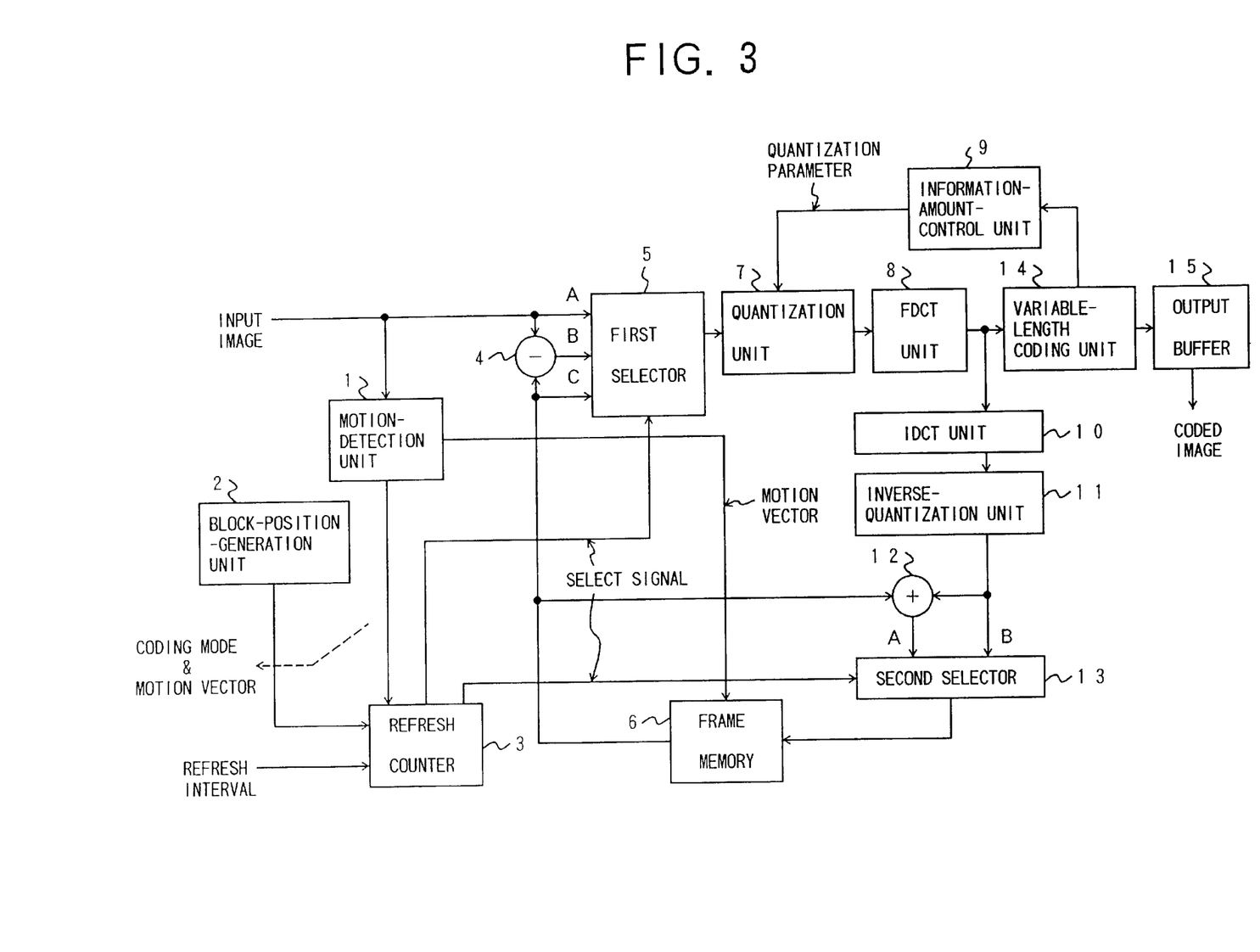
FIG. 3 is a block diagram of an image processing device according to an embodiment of the present invention.

FIG. 3 is a block diagram of an image processing device according to an embodiment of the present invention. The image processing device of FIG. 3 includes a motion-detection unit 1, a block-position-generation unit 2, a refresh counter 3, a subtracter 4, a first selector 5, a frame memory 6, a quantization unit 7, a FDCT (forward discrete cosine transform) unit 8, an information-amount-control unit 9, an IDCT (inverse discrete cosine transform) unit 10, an inverse-quantization unit 11, an adder 12, a second selector 13, a variable-length coding unit 14, and an output buffer 15.

In this embodiment, the motion-detection unit 1, the subtracter 4, the first selector 5, the frame memory 6, the quantization unit 7, the FDCT unit 8, the information-amount-control unit 9, the IDCT unit 10, the inverse-quantization unit 11, the adder 12, the second selector 13, and the variable-length coding unit 14 make up coding means, with the first selector 5 and the second selector 13 together effecting the switching between the intra-frame coding and the inter-frame coding. The block-position-generation unit 2 and the refresh counter 3 form refresh-operation-control means, which controls the first selector 5 and the second selector 13 to prompt the coding means to carry out the refresh operations.

Input image signals in a digital form are supplied to the motion-detection unit 1, the subtracter 4, and the first selector 5. Each frame of the input images includes a plurality of blocks dividing the frame. The motion-detection unit 1 detects motion of each block in the input images to obtain motion vectors of blocks, and, also, determines a coding mode based on errors remaining after motion compensation and the like. If the errors remaining after motion compensation, i.e., the differentials between a currently processed block and a corresponding block, are excessively large, for example, a current frame of the input images is likely to be that of a scene change or the like. The motion-detection unit 1 in this case sets the coding mode to the intra-frame coding. Otherwise, the motion-detection unit 1 basically sets the coding mode to the inter-frame coding.

Further, the motion-detection unit 1 decides if the currently processed block has invalid coefficients or valid coefficients based on the errors remaining after motion compensation. The information as to whether the currently processed bock has invalid coefficients or valid coefficients is used by various units in the image processing device.

The block-position-generation unit 2 holds a block number of a currently processed block. The refresh counter 3 has counters each for a corresponding block, and receives the motion vectors and the coding mode from the motion-detection unit 1, the block number of the current block from the block-position-generation unit 2, and a refresh interval which is predetermined. The refresh counter 3 controls the counter of the current block as to whether to count up or to reset, and, also, outputs select signals to control the first selector 5 and the second selector 13.

The first selector 5 receives one of the select signals from the refresh counter 3, and selects one of three inputs A, B, and C to output the selected image. The input A is the input images, the input B is differentials between frames obtained by the subtracter 4, and the input C is reference frames from the frame memory 6. The input images A are selected when the intra-frame coding is carried out for the refresh operations, or is carried out for other than the refresh operations during the normal operations. (Here, the normal operations refer to the coding operations other than the refresh operations.) The inter-frame differentials B from the subtracter 4 are chosen when the inter-frame coding is carried out during the normal operations. Further, the reference frames C are selected when the reference frames are subjected to the intra-frame coding during the refresh operations.

Data selected by the first selector 5 is quantized by the quantization unit 7, is subjected to the discrete cosine transform by the FDCT unit 8, is converted into variable-length codes by the variable-length coding unit 14, and is output at a constant bit rate as coded images via the output buffer 15. The data from the FDCT unit 8 is also supplied to the IDCT unit 10 to be subjected to the inverse discrete cosine transform, and, then, goes through the inverse quantization by the inverse-quantization unit 11 to produce locally decoded images. A locally decoded image is stored in the frame memory 6 via the second selector 13 as a reference frame for a next input frame.

The second selector 13 receives one of the select signals from the refresh counter 3, and selects one of the inputs A and B. For the intra-frame coding, the input B is selected. For the inter-frame coding, the input A is selected. The frame memory 6 receives the motion vectors from the motion-detection unit 1, and outputs reference frames after counting motion compensation based on the motion vectors. These reference frames are supplied to the subtracter 4 and the adder 12.

The information-amount-control unit 9 is used for controlling the amount of information such that it does not become excessively large. The information-amount-control unit 9 checks the amount of information generated by the variable-length coding unit 14, and controls quantization parameters of the quantization unit 7 so as to make an average amount of the coded-image information a predetermined amount.

The motion-detection unit 1, the block-position-generation unit 2, the subtracter 4, the frame memory 6, the quantization unit 7, the FDCT unit 8, the information-amount-control unit 9, the IDCT unit 10, the inverse-quantization unit 11, the adder 12, the variable-length coding unit 14, and the output buffer 15 are elements of known techniques, and a further detailed description thereof will be omitted.

Figure 4:
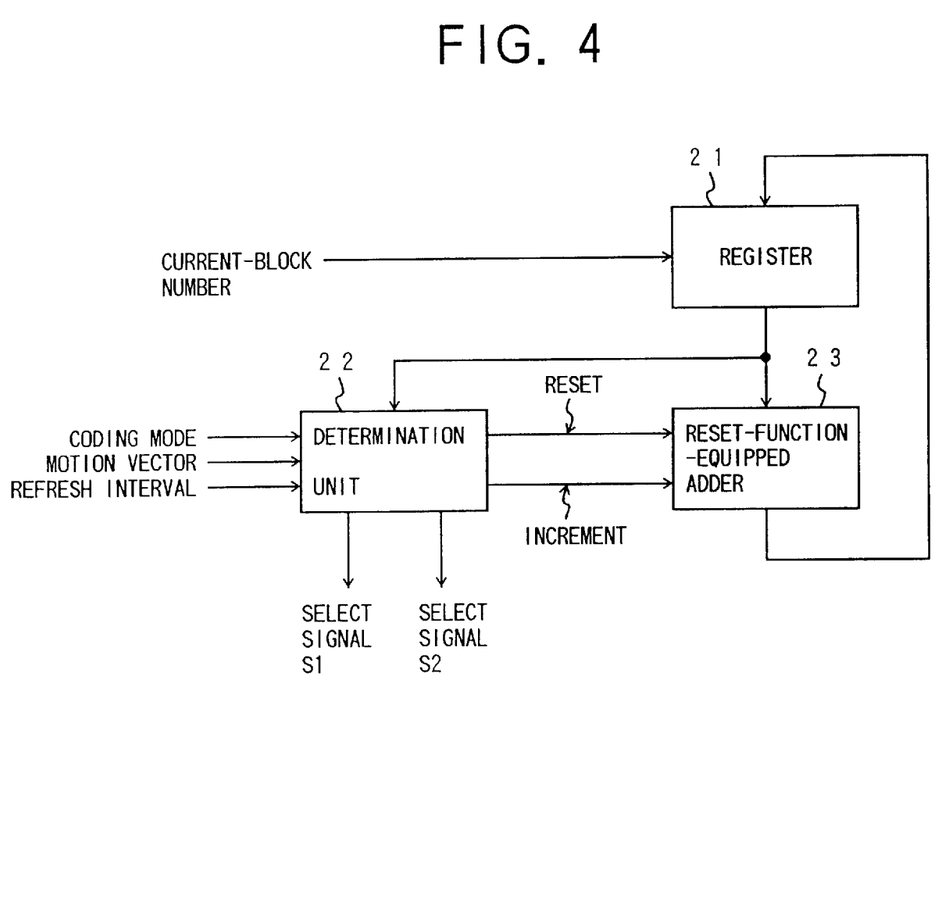
FIG. 4 is a block diagram of a refresh counter of FIG. 3 according to the embodiment of the present invention.

FIG. 4 is a block diagram of the refresh counter 3 according to the embodiment of the present invention. The refresh counter 3 of FIG. 4 includes a register 21, a determination unit 22, and a reset-function-equipped adder 23, and these elements show a brief configuration of the refresh-operation-control means. The register 21 holds count numbers each for a corresponding block, and receives the current-block number from the block-position-generation unit 2. The register 21 updates a count number of a block specified by the current-block number to an output of the reset-function-equipped adder 23. The count number is either updated to an incremented number or reset. In this manner, the register 21 and the reset-function-equipped adder 23 together serve as a counter with a reset function for each corresponding block.

The determination unit 22 receives the motion vectors and the coding mode from the motion-detection unit 1, the count numbers from the register 21, and the predetermined refresh interval. The determination unit 22 supplies instruction signals to the reset-function-equipped adder 23 to instruct an increment of the count numbers or a reset of the count numbers, and, also, supplies select signals S1 and S2 to the first selector 5 and the second selector 13, respectively.

Figure 5:
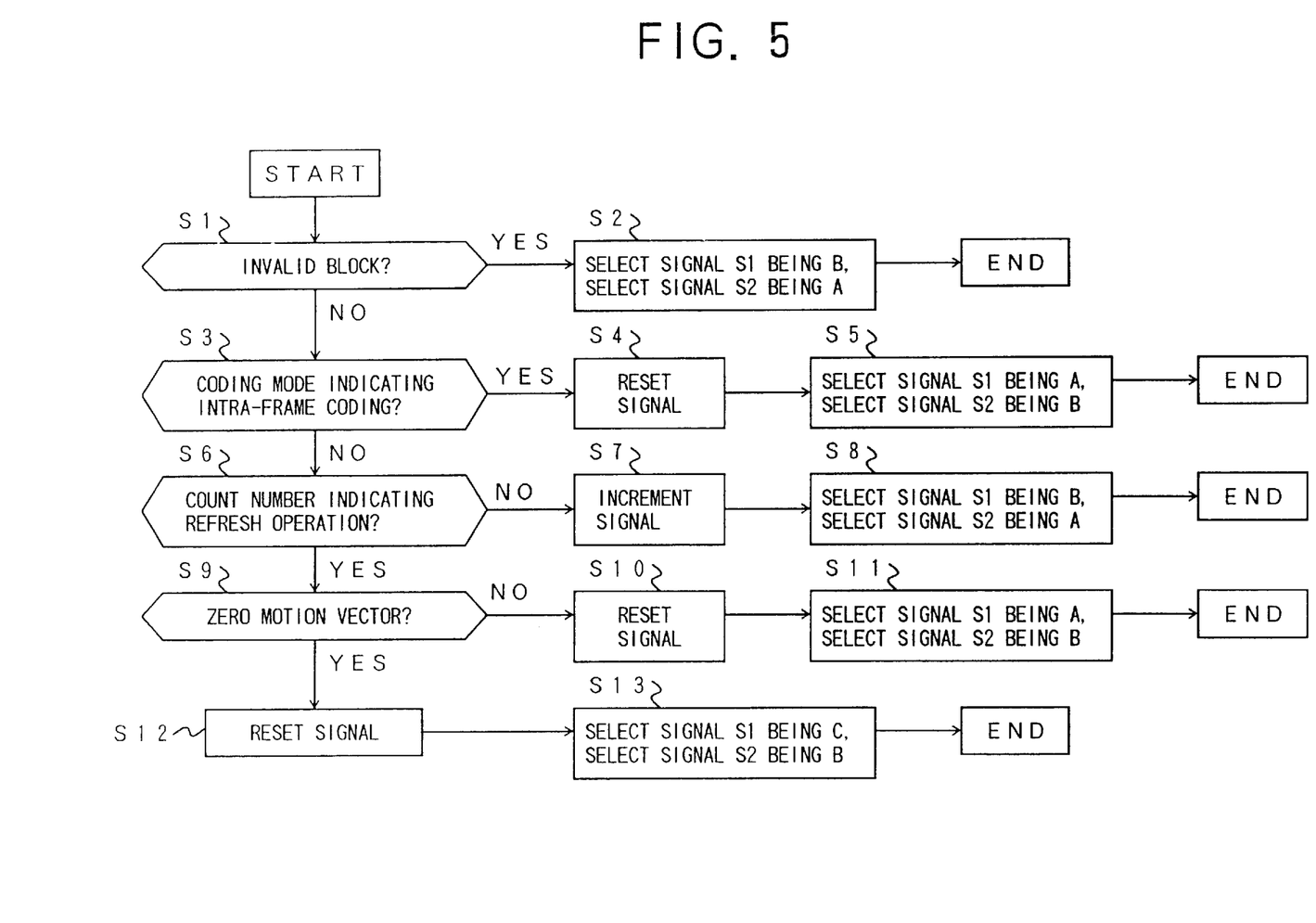
FIG. 5 is a flowchart of an operation procedure of a determination unit of FIG. 4.

FIG. 5 is a flowchart of an operation procedure of the determination unit 22. That is, the determination unit 22 operates according to this procedure for each block.

At step S1, the determination unit 22 checks whether a currently processed block is an invalid block based on the check result by the motion-detection unit 1. Here, the invalid block is a block with invalid coefficients, i.e., a block having insignificant differences with respect to a corresponding block in view of the quantization step sizes so that there is no need to transmit the differences to the receiver side. If the currently processed block is an invalid block, the procedure goes to step S2. Otherwise, the procedure goes to step S3.

At the step S2, the determination unit 22 outputs the select signal S1 being B and the select signal S2 being A. Receiving the select signal S1 set to B, the first selector 5 selects the input B to supply the inter-frame differentials (substantially zero) to the quantization unit 7. With the select signal S2 being A, the second selector 13 selects the output of the adder 12 which adds the corresponding block of the reference frame from the frame memory 6 to the inter-frame differentials from the inverse-quantization unit 11. Since the inter-frame differentials are substantially zero in the case of the invalid block, the output of the adder 12 is substantially the same as the corresponding block of the reference frame, which is thus stored again in the frame memory 6. This ends the procedure with respect to this branch of the flowchart.

At the step S3, the determination unit 22 checks whether the currently processed block is to be subjected to the intra-frame coding, based on the coding mode from the motion-detection unit 1. As previously described, when a scene change occurs during successive frames of inter-frame coding, for example, the next frame is to be subjected to the intra-frame coding. The step S3 detects such intra-frame coding during the normal operations, rather than the intra-frame coding for the refresh operations. If the intra-frame coding is to be used, the procedure goes to step S4. Otherwise, the procedure goes to step S5.

At the step S4, the determination unit 22 outputs a reset signal, which is supplied to the reset-function-equipped adder 23. The reset-function-equipped adder 23 receiving the reset signal clears the count number of the pertinent block to zero, and supplies the cleared count number to the register 21. The register 21 thus has a count number of zero for a block corresponding to the currently processed block, indicating a restart of counting a refresh-operation interval.

At the step S5, the determination unit 22 outputs the select signal S1 being set to A and the select signal S2 being set to B. Receiving the select signal S1 being A, the first selector 5 selects the input A to output the input image, relevant to the intra-frame coding. With the select signal S2 being B, the second selector 13 selects the output of the inverse-quantization unit 11, which is a reconstructed input image, and is stored in the frame memory 6. This ends the procedure with respect to this branch of the flowchart.

Accordingly, the steps S4 and S5 carry out the intra-frame coding during the normal operations, i.e., for other than the refresh-operation purposes. Since the count number in the register 21 is reset to zero, frame counting to decide the refresh timing will be restarted from a next frame. Namely, the intra-frame coding during the normal operations is not independent of the refresh operations in the present invention, and, thus, an undue increase in the number of intra-frame-coded frames can be avoided.

Figure 6:
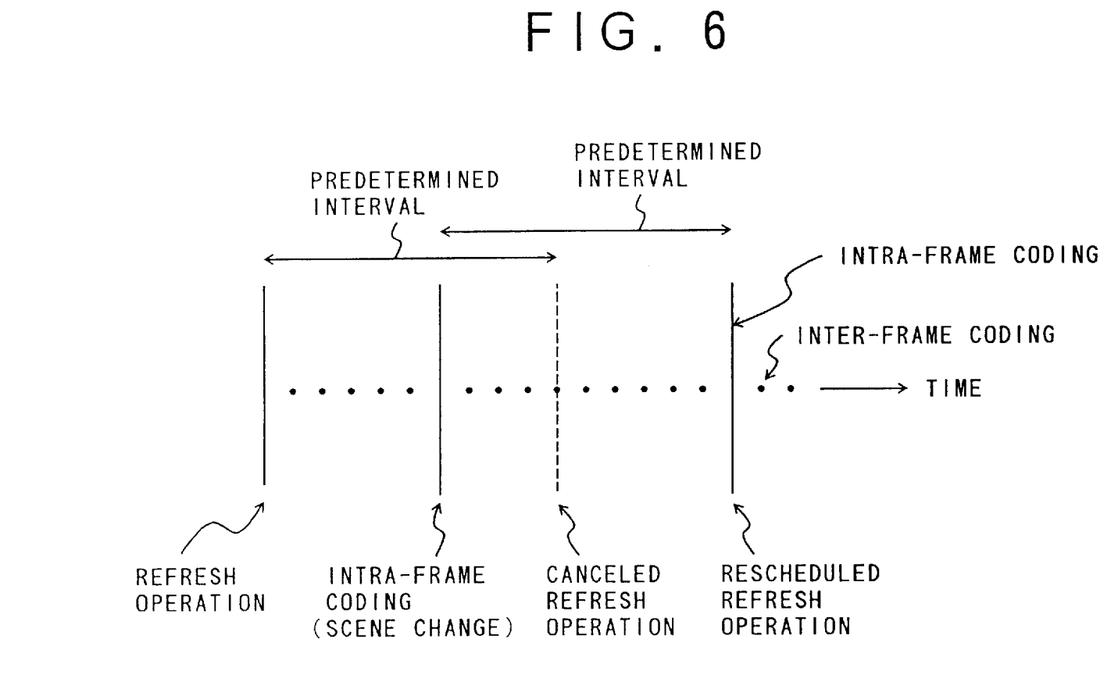
FIG. 6 is an illustrative drawing showing a schedule of the intra-frame coding according to the present invention.

FIG. 6 is an illustrative drawing showing a schedule of the intra-frame coding according to the present invention. As shown in FIG. 6, the intra-frame coding carried out at a scene change, for example, resets the count number to restart the frame counting, so that a next refresh operation is due to take place in a predetermined time period after the timing of the scene change. In this manner, the schedule of the refresh operations is rearranged in response to the intra-frame coding taking place during the normal operations (e.g., the intra-frame coding for the scene change), thereby avoiding an undue increase in the amount of information when sending the encoded images.

With reference back to FIG. 5, at the step S6, the determination unit 22 checks whether the count number indicates the refresh operation. Namely, the determination unit 22 determines if the count number of the currently processed block coincides with the interval of the refresh operation. If it is time to conduct the refresh operation, the procedure goes to step S9. Otherwise, the procedure goes to step S7.

At the step S7, the determination unit 22 issues an increment signal to the reset-function-equipped adder 23. The reset-function-equipped adder 23 receiving the increment signal increments the count number of the currently processed block by 1, and supplies the updated count number to the register 21.

At the step S8, the determination unit 22 outputs the select signal S1 being set to B and the select signal S2 being set to A. Receiving the select signal S1 set to B, the first selector 5 selects the input B from the subtracter 4 to supply the inter-frame differentials to the quantization unit 7. With the select signal S2 being A, the second selector 13 selects the output of the adder 12 which adds the corresponding block of the reference frame from the frame memory 6 to the inter-frame differentials from the inverse-quantization unit 11. Since the inter-frame differentials are added to the corresponding block of the reference frame, the output of the adder 12 is the same as the currently processed block of the current frame, which is stored in the frame memory 6.

In this manner, the inter-frame coding is carried out at the step S8. This ends the procedure with respect to this branch of the flowchart.

At the step S9, the determination unit 22 checks whether the motion vector of the currently processed block is substantially zero. That is, a check is made whether the motion vector supplied from the motion-detection unit 1 is smaller than a predetermined size. If the motion vector is not zero (i.e., the currently processed block is a motion block), the procedure goes to step S10. If the motion vector is zero (i.e., the currently processed block is a motionless block), the procedure goes to step S12.

At the step S10, the determination unit 22 outputs a reset signal, which is supplied to the reset-function-equipped adder 23. The reset-function-equipped adder 23 receiving the reset signal clears the count number of the pertinent block to zero, and supplies the cleared count number to the register 21. The register 21 thus has a count number of zero for a block corresponding to the currently processed block, indicating a restart of counting a refresh-operation interval.

At the step S11, the determination unit 22 outputs the select signal S1 being set to A and the select signal S2 being set to B. Receiving the select signal S1 being A, the first selector 5 selects the input A to output the input image, relevant to the intra-frame coding. With the select signal S2 being B, the second selector 13 selects the output of the inverse-quantization unit 11, which is a reconstructed input image, and is stored in the frame memory 6.

In this manner, the steps S10 and S11 carry out the intra-frame coding for the refresh operation. This ends the procedure with respect to this branch of the flowchart.

At the step S12, the determination unit 22 issues a reset signal, which is supplied to the reset-function-equipped adder 23. The reset-function-equipped adder 23 receiving the reset signal clears the count number of the pertinent block to zero, and supplies the cleared count number to the register 21. The register 21 thus has a count number of zero for a block corresponding to the currently processed block, indicating a restart of counting a refresh-operation interval.

At the step S13, the determination unit 22 outputs the select signal S1 being set to C and the select signal S2 being set to B. Receiving the select signal S1 being C, the first selector 5 selects the input C to output the corresponding block of the reference frame. With the select signal S2 being B, the second selector 13 selects the output of the inverse-quantization unit 11, which is a reconstructed reference-frame image, and is stored in the frame memory 6.

In this manner, the step S13 uses the reference frame, rather than the input frame, as a frame being subjected to the intra-frame coding for the refresh operation. The use of the reference frame is justified by the following reasons.

If the refresh operation is carried out by applying the intra-frame coding to the currently processed block, this block ends up having a reconstructed image quality far better than that of the surrounding blocks, which are likely subjected to the inter-frame coding. Such a difference in image quality arouses odd visual sensation. To obviate this problem, this embodiment of the present invention uses the corresponding block as a block to be subjected to the intra-frame coding for the refresh operation if the currently processed block is a motionless block. Since the corresponding block of the reference frame incurs quantization errors through the coding and decoding processes prior to storage in the frame memory 6, the reconstructed image has similar image quality to those of the surrounding blocks, thereby suppressing odd visual sensation.

It should be noted that the corresponding block of the reference frame is only used when the currently processed block is a motionless block, and the corresponding block in this case has the same spatial position within a frame as that of the currently processed block. If the currently processed block is a motion block, this currently processed block is used for the intra-frame coding of the refresh operation, rather than using the corresponding block of the reference frame. This is because the use of the corresponding block of the reference frame when the motion is present may result in an insertion of an inappropriate block into a position of the currently processed block.

Figure 7A:
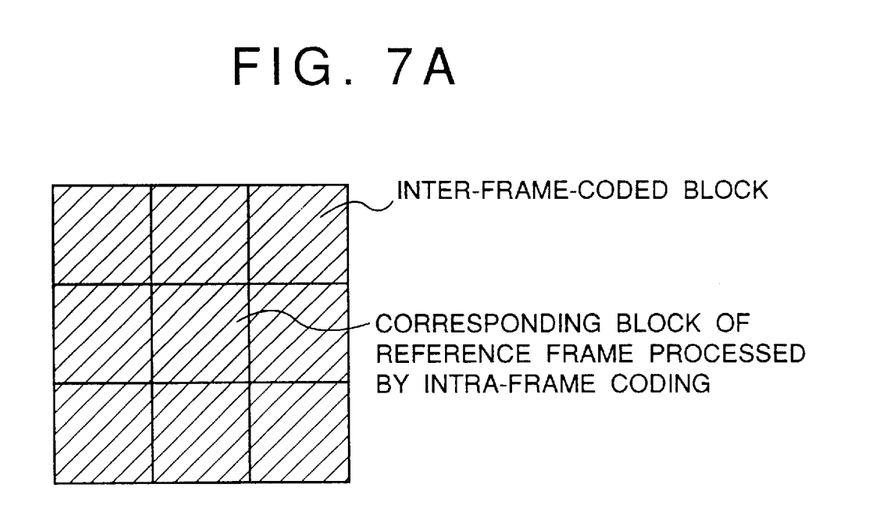
FIGS. 7A and 7B are illustrative drawings showing resulting images of refresh operations according to the present invention.
Figure 7B:
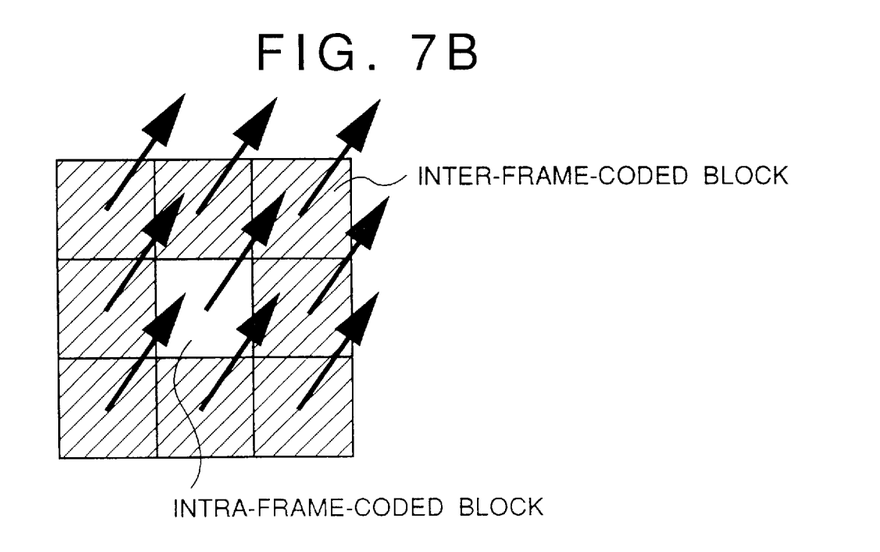

FIGS. 7A and 7B are illustrative drawings showing resulting images of the refresh operations according to the present invention. FIG. 7A shows a case in which the refresh operation of the present invention is carried out in a motion-less block. Since the corresponding block of the reference frame is used for the intra-frame coding, the block subjected to the refresh operation has no noticeable difference in image quality compared to the surrounding blocks. FIG. 7B shows a case in which the refresh operation of the present invention is carried out in a motion block. Although the currently processed block is used for the intra-frame coding of the refresh operation, a difference in image quality with the surrounding blocks is hard to notice because of interfering presence of the motion.

As described above, the present invention controls the intervals of the block-wise refresh operations such that an interval starts from the intra-frame coding of a refresh operation or the intra-frame coding for purposes other then the refresh operations. This achieves elongation of intervals between the intra-frame coding as much as possible so as to enhance the coding efficiency without causing an undue reduction in image quality.

Further, the present invention uses the corresponding block of the reference frame as a block to be subjected to the intra-frame coding of the refresh operation when the currently processed block is found to be a motionless block. This achieves the coding of moving pictures without arousing odd visual sensation.

Further, the present invention is not limited to these embodiments, but various variations and modifications may be made without departing from the scope of the present invention.

What is claimed is:

1. A device for coding moving pictures, comprising:

coding means for applying intra-frame coding or inter-frame coding to each of a plurality of blocks dividing each frame of said moving pictures;

a counter provided for each of said blocks, said counter being incremented when said coding means applies said inter-frame coding; and determination means for resetting said counter and controlling said coding means to carry out a refresh operation when said counter indicates that the predetermined interval has expired and for resetting said counter when said coding means applies said intra-frame coding during one of said predetermined intervals.

2. The device as claimed in claim 1, wherein said coding means comprises means for generating a signal to indicate whether to apply said intra-frame coding or said inter-frame coding, and wherein said determination means resets said counter when said signal indicates said intra-frame coding.

3. The device as claimed in claim 1, wherein said determination means controls said coding means to carry out said refresh operation by applying said intra-frame coding to either one of a currently processed block of a current frame or a corresponding block of a reference frame.

4. The device as claimed in claim 3, wherein said coding means comprises means for detecting a motion vector for said currently processed block, and wherein said determination means controls said coding means to apply said intra-frame coding to said currently processed block when said motion vector indicates motion, and controls said coding means to apply said intra-frame coding to said corresponding block when said motion vector is substantially zero.

5. A device for coding moving pictures, comprising:

coding means for applying intra-frame coding or inter-frame coding to each of a plurality of blocks dividing each frame of said moving pictures; and refresh-operation-control means for controlling said coding means to carry out a refresh operation at predetermined intervals by applying said intra-frame coding to a currently processed block of a current frame under a first condition and to a corresponding block of a reference frame under a second condition.

6. The device as claimed in claim 5, wherein said coding means comprises means for detecting a motion vector for said currently processed block, and wherein said first condition occurs when said motion vector indicates motion, and wherein said second condition occurs when said motion vector is substantially zero.

7. A method of applying intra-frame coding or inter-frame coding to each block dividing each frame of moving pictures, comprising a) applying said intra-frame coding or said inter-frame coding to each of said blocks depending on characteristics of each of said blocks;

b) incrementing a counter provided for a given one of said blocks when said inter-frame coding is applied to said given one of said blocks;

c) resetting said counter and carrying out a refresh operation by applying said intra-frame coding to said given one of said blocks when said counter indicates that a predetermined interval has expired; and d) resetting said counter when said intra-frame coding is applied to said given one of said blocks during one of said predetermined intervals.

8. A method of carrying out a refresh operation by applying intra-frame coding to each of a plurality of blocks dividing each frame of moving pictures, comprising:

carrying out said refresh operation by applying said intra-frame coding to a currently processed block of a current frame when said currently processed block is a motion block; and carrying out said refresh operation by applying said intra-frame coding to a corresponding block of a reference frame when said currently processed block is a motionless block.

9. A method of applying intra-frame coding or inter-frame coding to each block dividing each frame of moving pictures, comprising:

a) incrementing a counter when the inter-frame coding is applied to a given one of the blocks;

b) resetting the counter and applying the intra-frame coding to the given one of the blocks when the counter indicates that a predetermined interval has expired; and c) resetting the counter when the intra-frame coding is applied to the given one of the blocks during one of the predetermined intervals.

* * * * *

UNITED STATES PATENT AND TRADEMARK OFFICE
CERTIFICATE OF CORRECTION

PATENT NO.:   5,825,425
DATED     :   October 20, 1998
INVENTOR(S):  Kimihiko KAZUI et al.

It is certified that error appears in the above-identified patent and that said Letters Patent is hereby corrected as shown below:

On the title page, in the Abstract, line 3, delete "of" (first occurrence).

Signed and Sealed this

Sixteenth Day of February, 1999

Attest:

Attesting Officer

Acting Commissioner of Patents and Trademarks